(12) United States Patent
Chickering et al.

(10) Patent No.: US 8,001,610 B1
(45) Date of Patent: Aug. 16, 2011

(54) NETWORK DEFENSE SYSTEM UTILIZING ENDPOINT HEALTH INDICATORS AND USER IDENTITY

(75) Inventors: Roger Chickering, Granite Bay, CA (US); Sampath Srinivas, Cupertino, CA (US); Timothy Liu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 917 days.

(21) Appl. No.: 11/236,987

(22) Filed: Sep. 28, 2005

(51) Int. Cl.
*G06F 7/04* (2006.01)
(52) U.S. Cl. .......................................... 726/27; 709/225
(58) Field of Classification Search .................... 726/11, 726/25, 1–2, 4, 22–27, 28, 29; 713/201, 713/182–186; 709/223–226
See application file for complete search history.

(56) References Cited

U.S. PATENT DOCUMENTS

| | | | | |
|---|---|---|---|---|
| 6,161,139 | A * | 12/2000 | Win et al. | 709/225 |
| 6,633,872 | B2 * | 10/2003 | Ambrosini et al. | 707/9 |
| 7,178,166 | B1 * | 2/2007 | Taylor et al. | 726/25 |
| 7,185,192 | B1 * | 2/2007 | Kahn | 713/155 |
| 7,392,546 | B2 * | 6/2008 | Patrick | 726/26 |
| 2001/0044894 | A1 * | 11/2001 | Saito et al. | 713/156 |
| 2003/0055994 | A1 * | 3/2003 | Herrmann et al. | 709/229 |
| 2003/0158929 | A1 * | 8/2003 | McNerney | 709/223 |
| 2003/0196114 | A1 | 10/2003 | Brew et al. | |
| 2004/0107360 | A1 * | 6/2004 | Herrmann et al. | 713/201 |
| 2004/0111643 | A1 * | 6/2004 | Farmer | 713/201 |
| 2004/0122910 | A1 | 6/2004 | Douglass et al. | |
| 2004/0160903 | A1 * | 8/2004 | Gai et al. | 370/254 |
| 2004/0225657 | A1 * | 11/2004 | Sarkar | 707/9 |
| 2005/0021977 | A1 * | 1/2005 | Oberst | 713/182 |
| 2005/0071658 | A1 * | 3/2005 | Nath et al. | 713/193 |
| 2005/0235352 | A1 * | 10/2005 | Staats et al. | 726/14 |
| 2005/0240550 | A1 * | 10/2005 | Armes et al. | 707/1 |
| 2005/0246767 | A1 * | 11/2005 | Fazal et al. | 726/11 |
| 2005/0251854 | A1 * | 11/2005 | Shay | 726/2 |
| 2006/0026683 | A1 * | 2/2006 | Lim | 726/23 |
| 2006/0075502 | A1 * | 4/2006 | Edwards | 726/24 |
| 2006/0090208 | A1 * | 4/2006 | Smith | 726/26 |
| 2006/0101517 | A1 * | 5/2006 | Banzhof et al. | 726/25 |
| 2006/0179472 | A1 * | 8/2006 | Chang et al. | 726/2 |
| 2007/0006288 | A1 * | 1/2007 | Mayfield et al. | 726/5 |

(Continued)

OTHER PUBLICATIONS

Nortel networks, notel secure network access architecture, Jul. 11, 2005.*

(Continued)

*Primary Examiner* — Matthew B Smithers
*Assistant Examiner* — Abu Sholeman
(74) *Attorney, Agent, or Firm* — Shumaker & Sieffert, P.A.

(57) ABSTRACT

An endpoint defense system uses endpoint health indicators and user identity information to provide fine-grain access control over network resources. For example, the endpoint defense system may include a controller, a set of protection devices, and a set of agents. The agents are software applications installed on a set of endpoints to gather the health information that represents security states of the endpoint devices. The agents send updated health information to the controller. In response to a login attempt, the controller processes the health indicators and identity information through a set of administrator-defined policies to generate a set of access rights. The controller transfers the set of access rights to the protection devices. The protection devices then control user access to network resources according to the set of access rights. The controller sends updated sets of access rights to the protection devices whenever the access rights change.

41 Claims, 4 Drawing Sheets

U.S. PATENT DOCUMENTS

| | | | |
|---|---|---|---|
| 2007/0056019 A1* | 3/2007 | Allen et al. | 726/1 |
| 2007/0143824 A1* | 6/2007 | Shahbazi | 726/1 |
| 2007/0169171 A1* | 7/2007 | Kumar et al. | 726/2 |

OTHER PUBLICATIONS

Office Action from U.S. Appl. No. 11/346,062, dated Dec. 9, 2009, 74 pp.

Response to Office Action dated Dec. 9, 2009 from U.S. Appl. No. 11/346,062, filed Mar. 9, 2009, 30 pp.

Office Action from U.S. Appl. No. 11/346,062, dated Apr. 21, 2010, 90 pp.

Response to Office Action dated Apr. 21, 2010, from U.S. Appl. No. 11/346,062, filed Jul. 21, 2010, 24 pp.

* cited by examiner

NETWORK DEFENSE SYSTEM UTILIZING ENDPOINT HEALTH INDICATORS AND USER IDENTITY

TECHNICAL FIELD

The invention relates to computer networks and, in particular, to security within computer networks.

BACKGROUND

A computer network is composed of a large collection of end-user devices (generally referred to herein as "endpoint devices") that access network resources provided by network servers or other devices. In other words, an endpoint device generally provides a user access to the resources provided by the servers or other devices. For example, a personal computer used in a home or office is often used as an endpoint device. On the other hand, servers or other devices that provide network resources generally employ multiple incoming and outgoing connections to concurrently provide the network resources to the endpoint devices. For instance, an electronic mail (e-mail) server likely services dozens or hundreds of connections from the endpoint devices as the users access the e-mail server to send and receive e-mail.

Because users often lack technical experience, endpoint devices often become misconfigured. For example, users may accidentally install viruses, spyware, or other software that can potentially damage the functionality of the endpoint device or compromise the security of the computer network to which the endpoint is coupled. Once affected, endpoint devices can inadvertently spread malicious software to the servers and possibly to other endpoint devices.

To overcome this problem, various companies have implemented endpoint device security software. In general, conventional security software determines whether an endpoint device contains malicious software. If malicious software is detected, the endpoint security software denies network access to the endpoint whereby the endpoint device is unable to access the network or is only allowed to access a server having anti-virus software or other software needed to address the problem. In other words, the defense system "quarantines" the affected endpoint.

SUMMARY

In general, embodiments consistent with the principles of the invention are directed to techniques to defend servers and other network resources against network attacks originating from endpoint devices within an enterprise. For example, a system is described in which a control device generates fine-grain access control information to control access to the servers and network resources based on the identity of the user requesting access as well as health information that represents a current security state of the endpoint being used. For example, the health information may describe whether the endpoint device contains malicious software (e.g. a virus or spyware), whether the endpoint has invalid configuration, or whether the endpoint has installed approved countermeasures (e.g., anti-virus software).

In one embodiment, a system comprises an endpoint device and a network resource coupled to a network. The endpoint device provides a user access to the network resource. In addition, the system includes a protection device that controls access to the network resource by the endpoint based on an identification of the user and health information associated with the endpoint device.

In another embodiment, a method comprises receiving identity information for a user attempting to access a network via an endpoint device, generating health information associated with the endpoint device, and controlling access to network resources on the basis of the identity information of the user and the health information of the endpoint device.

In another embodiment, a computer-readable medium comprises instructions. The instructions cause a programmable processor to receive identity information for a user attempting to access a network via an endpoint device, and generate health information associated with the endpoint device. The instructions further cause the processor to authenticate the identity information; assign access rights to the user based on the identity information and the health information; and control access to network resources based on the access rights.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
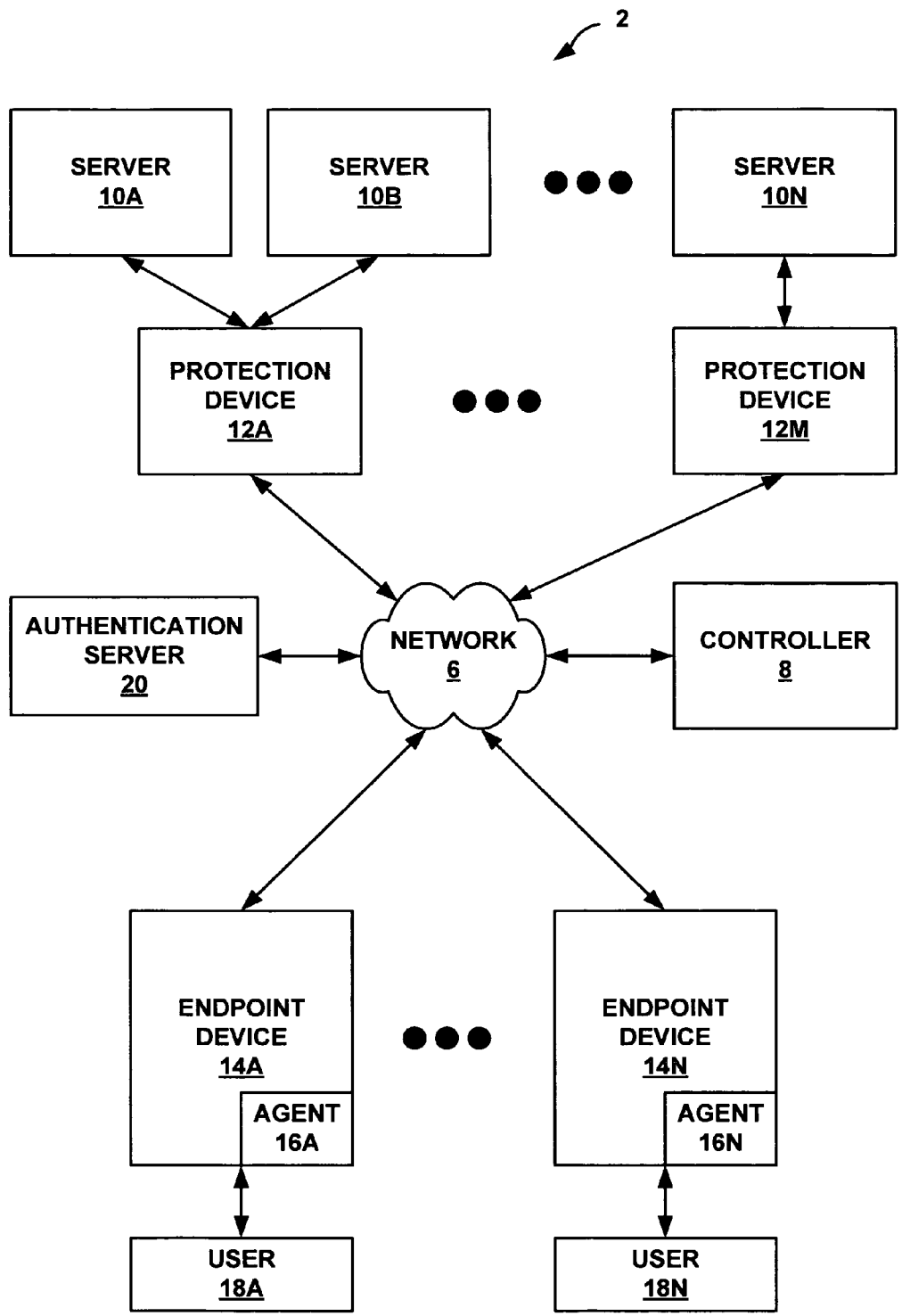
FIG. 1 is a block diagram illustrating an exemplary system in which an endpoint defense system is employed consistent with the principles of the invention.

FIG. 1 is a block diagram illustrating an exemplary system 2 in which an enterprise employs an endpoint defense system within a network 6 consistent with the principles of the invention. In this example, the endpoint defense system comprises a controller 8 and a set of protection devices 12A-12M (protection devices 12) that provide access control to a set of servers 10A-10N (servers 10), and a set of endpoint devices 14.

Servers 10 represent any device that provides one or more network resources accessible via network 6. For example, servers 10 may include email servers, domain controllers, web servers, print servers, printers, network copiers, gateways, intelligent switches, hubs or other network access points or devices.

Endpoint devices 14 represent devices that provide users 18 access to network 6 and, in particular, network resources provided by servers 10. For example, endpoint devices 14 may include desktop or laptop computers, network-enabled mobile devices, network-based phones, televisions or other devices.

Controller 8 provides fine-grain access control over servers 10. For example, controller 8 provides an authentication technique that generates access rights for each of users 18 based on identify profiles for the users as well as current "health information" associated with the particular one of endpoint devices 14 with which the users access network 6. In general, the term "health information" is used herein to generally refer to data that describes a security state of one of endpoint devices 14. For example, the health information may describe whether the specific one of endpoint devices 14 contains malicious software (e.g. a virus or spyware), whether the endpoint device has invalid configuration, or whether approved countermeasures (e.g., anti-virus software) have been properly installed on the endpoint device.

As one example, when user 18A attempts to connect to network 6 through endpoint device 14A, endpoint device 14A prompts user 18A for identity information. The identity information may be a username and a password, a biometric (e.g., a fingerprint or retina scan), or a combination these examples or other data that identify users 18 individually or by role. Endpoint defense agent 16A ("agent 16A") of endpoint 14A transmits the identity information to controller 8 for authentication. For example, controller 8 may access an authentication server 20 to authenticate the identity information. Authentication server 20 may be any type of authentication system, e.g., lightweight directory access protocol ("LDAP"), or Kerberos. If authentication fails, controller 8 directs endpoint 14A as well as protection devices 12 to deny endpoint 14A access to servers 10.

On the other hand, if controller 8 determines that the identity information is valid, e.g., the username and password match stored identification information, then the controller examines health information associated with endpoint 14A. For example, upon authenticating user 18A, controller 8 may request that agent 16A generate current health information and transmit the health information to the controller. Alternatively, agent 16A may have generated the health information and submitted the health information to controller 8 at the time the identify information for user 18A was submitted. As another example, agent 16A may have pre-generated the health information and previously submitted the health information to controller 8. Agent 16A may update the health information cached at controller 8 upon detecting a change to the health state of endpoint device 14A. Controller 8 may also download a program to agent 16A to determine the health of endpoint device 14A, or supplement the programs agent 16A already has.

Based on the identify information and the health state, controller 8 generates data specifying a set of access rights to servers 10. The access rights may be user-specific (i.e., individualized for each of users 18), health-specific (i.e., set based on the current health state of the endpoint), resource-specific (i.e., specific to particular resource provided by one or more of servers 10), or any combination thereof. Controller 8 may be a stand-alone network device, such as a network management device, domain controller, radius server, session border controller, or any other device. Alternatively, the functions described with respect to controller 8 may be incorporated within one or more network devices of computing environment 2, such as servers 10, protection devices 12 or endpoint devices 14.

Controller 8 communicates the access rights to one or more of protection devices 12 for controlling access to network resources by user 18A and endpoint device 14A. Protection device 12B monitors packet streams flowing between endpoint devices 14 and servers 10, and applies operations on the packet streams based on the access rights specified by controller 8. For example, protection devices 12 may be firewalls, attack detection devices or other intermediate devices that identify packet streams based on criteria. Example criteria include user roles, source addresses, destination addresses, source and destination media access control (MAC) addresses, ports and protocols. Protection devices 12 apply operations (e.g., selectively filter or transparently forward) the packet streams based on the access rights specified by controller 8. In this manner, protection devices 12 apply the fine-grain access rights to control access to network resources provided by servers 10.

Agents 16 represent software applications installed on endpoint devices 14. As described above, endpoint defense agents 16 generate health information that describes a security status of respective endpoint devices 14. The health information may take the form of a report listing a set of health indicators. A health indicator may be a negative feature such as the presence of a virus, spyware, or misconfigured software on the respective endpoint device. Alternatively, a health indicator may be a positive feature such as the presence of a software application like preferred anti-virus software or a spyware blocker.

In some embodiments, agents 16 may include personal (i.e., local) firewall software modules that add an additional level of protection. The personal firewalls of agents 16 operate in a manner similar to protection devices 12. That is, the personal firewalls of agents 16 may receive access rights from controller 8 generated based on identification information and health information for the users 18 and endpoint devices 14, respectively. The personal firewalls within agent 16 locally monitor outbound packet streams generated by software components (e.g., web browsers or other applications) executing on endpoint devices 14, and apply operations on the packet streams based on the access rights specified by controller 8 prior to introduction of the packets streams to network 6. In this manner, the firewall components may also apply fine-grain access rights to aid access control over network resources provided by servers 10. The personal firewalls also protect endpoint devices 14 from attacks sent by other devices on network 6.

In addition, embodiments of agents 16 may apply network cryptographic techniques, such as application of the Internet Protocol Security (IPSec) protocol, when communicating with controller 8 and servers 10. The encrypted packet flows may prevent certain attacks, such as malicious users or applications from spoofing a source network address.

In some embodiments, agents 16 provide user interfaces through which users 18 can manage the health of endpoint devices 14. For instance, agents 16 may provide user interfaces that prompt users 18 to install or update anti-virus software in the event the preferred software is not currently loaded on the respective endpoint devices 14.

The fine-grain, endpoint and user-based network security techniques may provide advantages. For example, filtering certain packet flows with protection devices 12 based on defined criteria specified by controller 8 (e.g., source and destination network address, source and destination MAC addresses, ports and protocols) may be faster and consume less resources than deep-scanning packet flows for virus patterns or indicators of a network attack. Moreover, protection devices 12 may be placed anywhere in network 6 to protect network resources, and the protection devices not need necessarily be configured to protect all servers 10. Rather, an enterprise may deploy enough protection devices 12 to encourage compliance with the policies of the enterprise. For example, an enterprise may deploy a single protection device 12 to prevent access to a critical network resource from the perspective of the user, e.g., email, thereby encouraging the user to bring the health of the endpoint device up to the standards defined by the enterprise.

Furthermore, the techniques allowing access control to be applied based on the user, endpoint, and network resource provide a great deal of flexibility with respect to access control for network 6. For example, assume that an organization has a "litigation" department and an "engineering" department. By assigning appropriate role (i.e., group) memberships to persons in these departments, the organization controls user access to specific servers. For instance, persons in the litigation department could access a server that stores litigation documents, but not a server that stores source code documents. Likewise, persons in the engineering department could access the server that stores source code documents, but not the server that stores litigation documents. The techniques allow controller 8 to generate access control rights in a flexible manner to address these and other situations.

Figure 2:
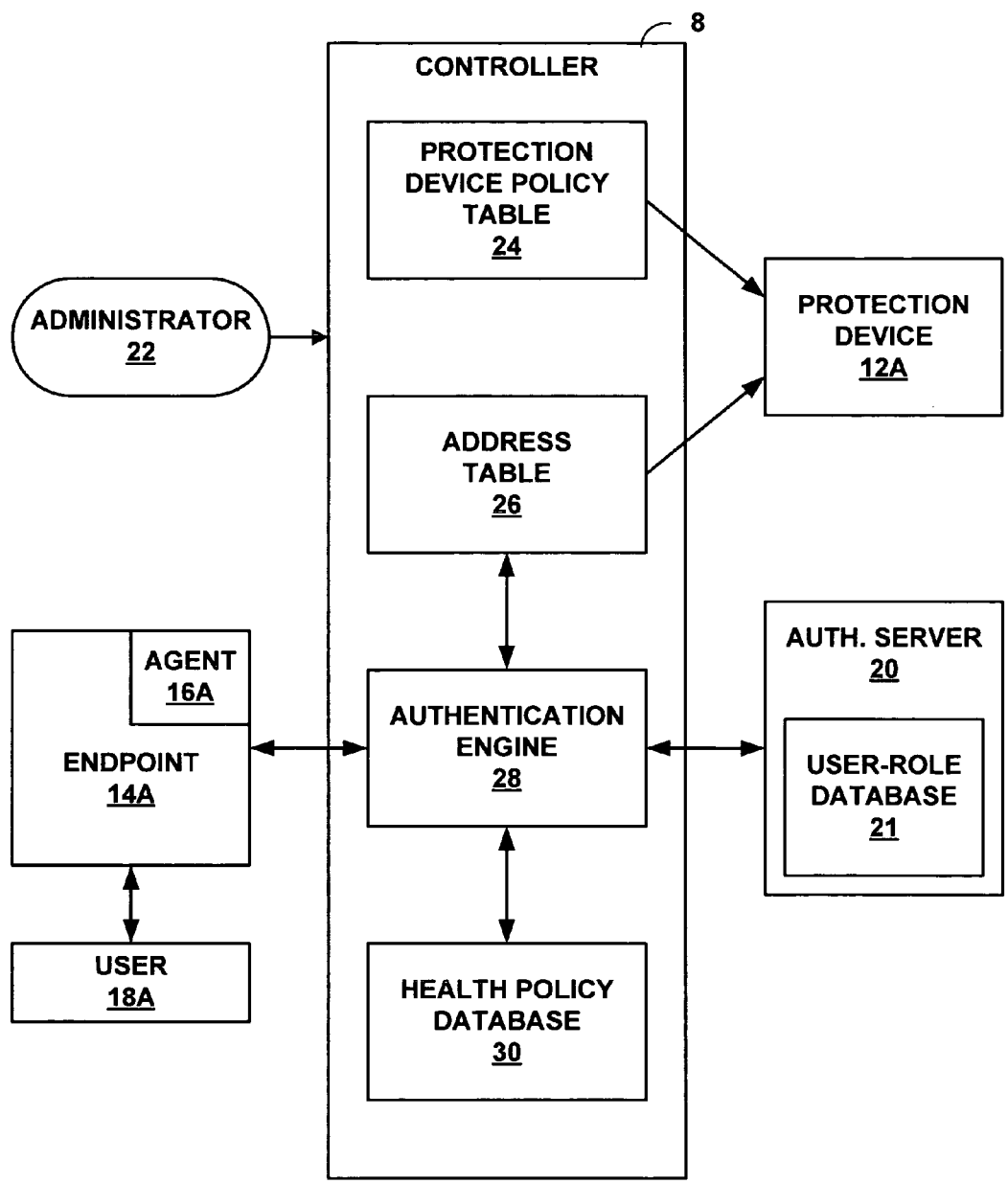
FIG. 2 is a block diagram illustrating an exemplary embodiment of a network controller that provides network security consistent with the principles of the invention.

FIG. 2 is a block diagram illustrating an example embodiment of controller 8 consistent with the principles of the invention. As illustrated in FIG. 1, controller 8 interacts with authentication server 20, a set of protection devices 12, and a set of endpoint devices 14. For purposes of illustration, only protection device 12A, endpoint 14A and authentication server 20 are depicted in FIG. 2.

In the example embodiment of FIG. 2, controller 8 includes four modules: a protection device policy table 24, an address table 26, an authentication engine 28 and a health policy database 30. Upon receiving identity information for user 18A from endpoint 14A, authentication engine 28 forwards the identity information to authentication server 20 for authentication. Authentication server 20 attempts to authenticate, for example, the username and password contained in the identity information. If authentication server 20 successfully authenticates the identity information, authentication server 20 returns a list of roles associated with the user. For example, authentication server 20 may return the roles "Employees," "Engineering" and "Wireless Group" if user 18A is an employee engineer working in the wireless technology group of the enterprise.

In addition, authentication engine 28 retrieves health information for endpoint 14A generated by endpoint defense agent 16A. The health information may take the form of a report listing whether endpoint 14A passes or fails on a set of health indicators, such as a list of whether a process is running on endpoint 14A and whether a virus is present. For example, endpoint defense agent 16A may include the following health indicators:

|  | Process Running? | Version |
|---|---|---|
| Indicator 1: | AntiVirus.exe | 4.8 |
| Indicator 2: | SpyStopper.exe | 5.1 |
|  | Virus Not Detected? |  |
| Indicator 3: | BlasterWorm |  |

Using these health indicators, endpoint defense agent 16A may send a report to authentication engine 28 as follows:

| Indicator 1: | Passed |
|---|---|
| Indicator 2: | Passed |
| Indicator 3: | Failed |

This example health report reveals to authentication engine 28 that endpoint 14A is currently running Antivirus version 4.8 and SpyStopper version 5.1. In addition, the health report shows that endpoint 14A is currently hosting the "BlasterWorm" virus.

Authentication engine 28 uses the health report to restrict the role memberships of user 18A retrieved from authentication server 20. After this restriction process, user 18A may be associated with fewer roles than before. For example, assume health policy database 30 contains data corresponding to the health indicators of the previous example. The following record might be included in such data:

| Health Indicator | Roles Excluded On Fail |
|---|---|
| Indicator 1: | "Wireless Group" |
| Indicator 2: | "Employees" |
| Indicator 3: | "Engineering" |

When authentication engine 28 receives the health report, authentication engine 28 queries health policy database 30 for role names associated with each failed health indicator in endpoint 14A. In this example, health policy database 30 returns the role "Engineering" because the "Blasterworm" is operating on endpoint 14A. However, because endpoint 14A is running Antivirus v. 4:8 and SpyStopper v. 5.1, health policy database 30 does not return the roles "Employees" or "Wireless Group". Thus, after restricting the identity information roles from authentication server 20 with the roles returned by health policy database 30, user 18A belongs to one role: "Wireless Group."

After generating the list of role memberships, authentication engine 28 creates a new entry in address table 26. This new entry stores a mapping from the network address of endpoint 14A to the list of role memberships of user 18A. Address table 26 may include the following entry:

| Source Address | Roles |
|---|---|
| 125.125.125.001 | "Wireless Group" |

When authentication engine 28 creates a new entry in address table 26, controller 8 sends the updated content of address table 26 to protection devices 12. Protection devices 12 retain a copy of address table 26 in their internal memory to use in filtering network packets. Protection devices 12 may take contingency actions specified by administrator 22 when protection devices 12 lose contact with controller 8. The contingency actions may include allowing access to all users, allowing access to no users, or allowing access only to current users.

Protection device policy table 24 prescribes the actions protection devices 12 take when a network packet arrives from endpoint devices 14. In this example, protection device policy table 24 contains three columns: roles, destination address, and actions. The "role" column enumerates a list of roles to which the entry applies. The "action" column specifies whether protection device 12A should drop the network packet or allow the network packet to proceed. The "destination address" column lists the servers to which the entry applies. For example, protection device 12A may protect the following five servers:

| IP address | Server Description |
|---|---|
| 1.1.1.1 | Email |
| 1.1.1.2 | Specification code control |
| 1.1.1.3 | Engineering marketing information |

-continued

| IP address | Server Description |
|---|---|
| 1.1.1.4 | Proprietary wireless specifications |
| 1.1.1.5 | Install server for Antivirus software |

The data in each row of protection device policy table 24 represents a policy that directs protection device 12A as to what action, if any, is to be applied given a set of roles and a destination address. Controller 8 distributes protection device policy table 24 to protection devices 12.

When a network packet arrives, protection device 12A retrieves the roles associated with the source address of the network packet and scans through protection device policy table 24. Protection device 12A scans through protection device policy table 24 from top to bottom. Thus, protection device 12A forwards or drops the packet as soon as it discovers an entry in protection device policy table 24 that matches the roles associated with the network packet and the destination address given by the network packet. For example, consider the following table:

| Roles | Destination | Action |
|---|---|---|
| any | 1.1.1.5 | permit |
| NOT Employees | any | deny |
| any | 1.1.1.1 | permit |
| Engineering | 1.1.1.2 | permit |
| Engineering, Marketing | 1.1.1.3 | permit |
| Wireless | 1.1.1.4 | permit |

The first entry permits users in any role to access the server at IP address 1.1.1.5 because, as listed above, the server having network address of 1.1.1.5 is the install server for antivirus software. For instance, both employees and outside contractors may access the antivirus software server. The second entry uses the "NOT" modifier on the set of roles. The "NOT" modifier means that the entry only applies if the user is not a member of the following role. In this case, the second entry denies access to all servers to all users not in the "Employees" role. Because protection device 12A evaluates the entries from top to bottom, a user not in the "Employees" role can still access the anti-virus server. The third entry permits access to the email server at 1.1.1.1 to members of all roles. However, because of the top to bottom evaluation of entries and the presence of the second entry, users not in the "Employees" role cannot access the email server. The other three entries define access to servers based on specific roles associated with the users. In this manner, the role-based security techniques have incorporated the use of health indicators and user identity to provide flexible, fine-grain security.

In other embodiments, protection device policy table 24 is more complex. For example, protection device policy table 24 may include a column listing a specific port associated with a destination network address. In addition, protection device policy table 24 may include columns specifying which networking protocols endpoint 14A may use in conjunction with a destination network address or specifying a range of network addresses. For example, administrator 22 could define an entry in protection device policy table 24 permitting members of the "Engineering" role to access transmission control protocol ("TCP") port 80 of destinations 1.1.2.1 through 1.1.2.255.

Figure 3:
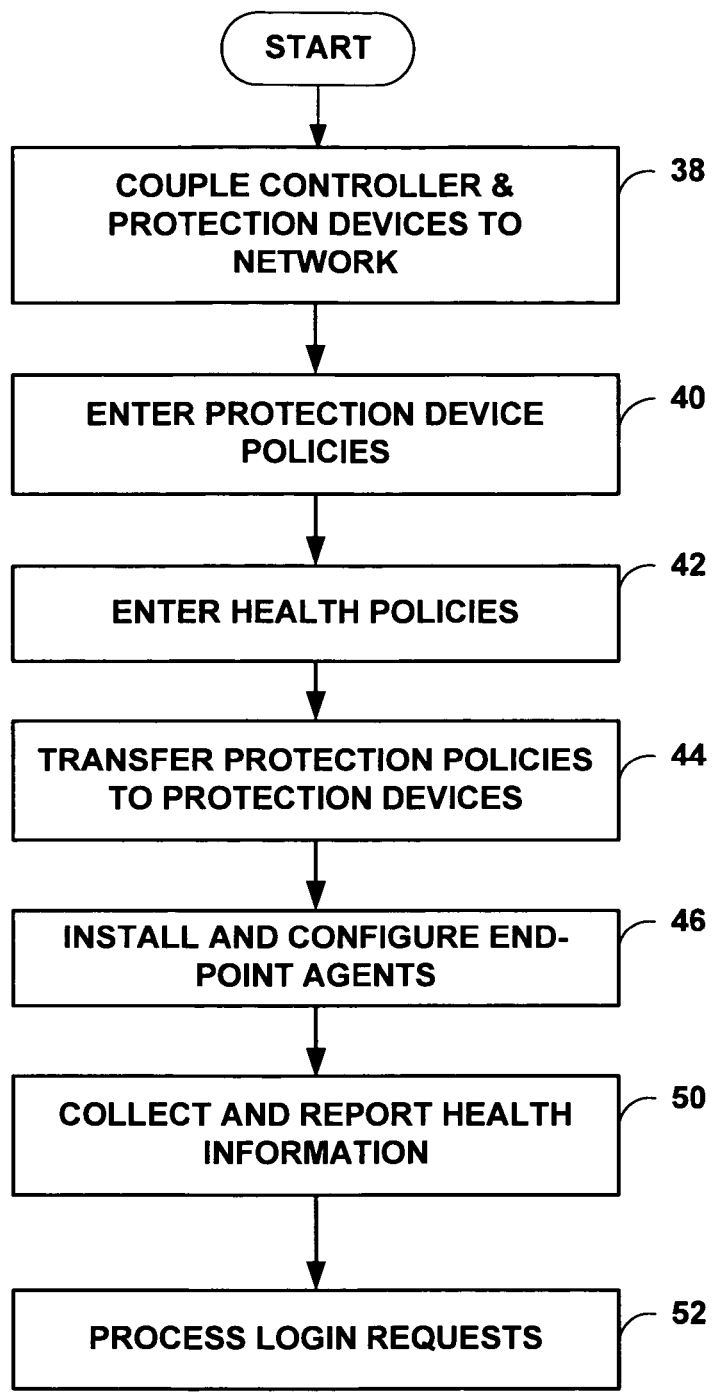
FIG. 3 is a flowchart illustrating an exemplary process by which the endpoint defense system is configured consistent with the principles of the invention.

FIG. 3 is a flowchart illustrating an exemplary process by which the endpoint defense system of FIG. 1 is configured consistent with the principles of the invention. Initially, administrator 22 (FIG. 2) begins by coupling controller 8 and protection devices 12 to network 6 (38). There are many positions in network 6 that administrator 22 can couple controller 8 and protection devices 12, and the administrator determines the topology of network 6 based on the needs of the enterprise.

After coupling controller 8 and protection devices 12 to network 6, administrator 22 enters protection policies into controller 8 to specify the actions carried out by protection devices (40). As described above, the protection device policies are recorded as entries in protection device policy table 24 of controller 8. Next, administrator 22 enters health policies into controller 8 to specify the health requirements of endpoint devices 14 (42). The health policies are recorded as entries in health policy database 30.

Once administrator 22 has entered the policies into controller 8, the controller communicates the entries in protection device policy table 24 to protection devices 12 (44). Administrator 22 can subsequently add, edit, or delete policies while controller 8 is running, causing controller 8 to process and transfer the policies to protection devices 12. Similarly, administrator 22 can add, edit, or delete policies in health policy database 30, which controller 8 applies when needed upon receiving health information from endpoint defense agent 16.

In addition, endpoint defense agents 16 are installed on endpoints devices 14 (46). Administrator 22 may install agents 16 locally or remotely, or endpoint devices 14 may be configured to automatically install the agents, e.g., as part of a network boot procedure. During this process, endpoint defense agents 16 may activate personal firewalls that protect endpoint devices 14 against virus attacks by other endpoint devices 14 as well as act upon outbound communications. In addition, administrator 22 configures agents 16 by specifying which health indicators the agents are to inspect and report (48).

Once endpoint configuration is complete, endpoint defense agents 16 begin monitoring and collecting health indicators about endpoint devices 14 (50). Endpoint defense agents 16 send health reports to controller 8 whenever controller 8 processes a login request. Thereafter, endpoint defense agents 16 send updated health reports periodically or whenever endpoint defense agents 16 detect a change in the health indicators of endpoint devices 14 (52).

Figure 4:
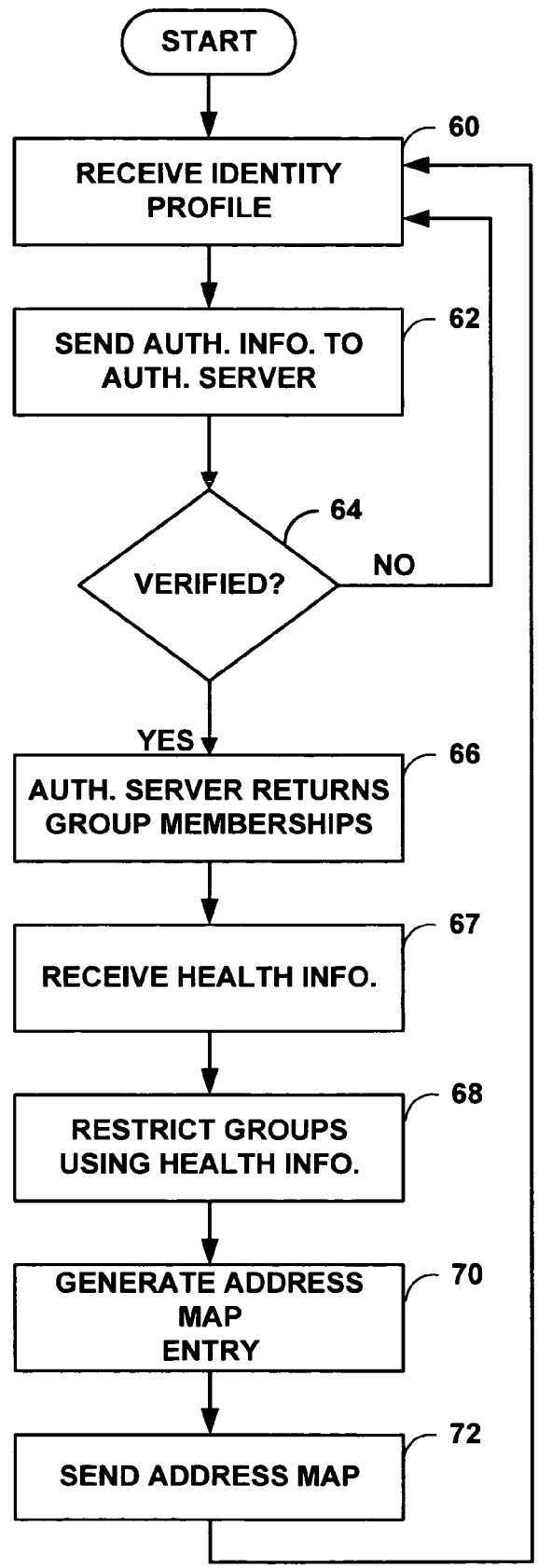
FIG. 4 is a flowchart illustrating exemplary operation of a controller during a network login procedure.

FIG. 4 is a flowchart illustrating an exemplary mode of operation for controller 8 when processing login requests consistent with the principles of the invention. Initially, controller 8 receives identity profile information from a user, such as user 18A of FIG. 1, who is attempting to access network 6 via an endpoint, such as endpoint 14A (60). Controller 8 then sends the identity information to authentication server 20 (62). Authentication server 20 verifies the identity information (64). If authentication server 20 finds the identity information invalid, controller 8 may request the identity information again or may immediately reject access. Otherwise, if authentication server 20 finds the identity information valid, authentication server 20 returns a list of role memberships to controller 8 (66).

Controller 8 then receives health information generated by endpoint defense agent 16A (67). As described above, endpoint defense agent 16A may send health information to controller 8 prior to or at the time the login is processed. For instance, endpoint defense agent 16A may send controller 8 updated health information whenever endpoint defense agent 16A detects a change in a health indicator of endpoint 14A. Such periodic updates help ensure that protection devices 12 have an accurate understanding of which users 18 presently belong to which roles. Alternatively, endpoint defense agent 16A may collect and communicate the health information at the time the login attempt is submitted by user 18A.

Once controller 8 receives the health information, controller 8 uses the health information to restrict the role memberships returned by authentication server 20 (68). Specifically, controller 8 queries health policy database 30 to retrieve a list of roles corresponding to failed health indicators contained in the health report. Controller 8 then removes the roles returned by health policy database 30 from the list of roles returned by authentication server 20. Using the remaining roles, controller 8 generates an entry in address map 26 (70). As discussed above, the entry in address map 26 translates criteria (e.g., a network address of endpoint 14A) to the roles retrieved from health policy database 30 and authentication server 20. Finally, controller 8 communicates address map 26 to protection devices 12, which apply actions to packet flows based on the roles retrieved from the address map (72). At this point the login process is complete and user 18A may be permitted to communicate with one or more network resources provided by servers 10. In communicating with the network resources, endpoint 14A may use cryptographic techniques (e.g., digital certificates and the IPSec protocol) to prevent network address mimic attacks.

Various embodiments of the invention have been described. These and other embodiments are within the scope of the following claims.

The invention claimed is:

1. A system comprising:
   one or more network resources coupled to a network;
   an endpoint device coupled to the network that provides a user access to the network resources;
   an agent that generates health information that represents a security state of the endpoint device, wherein the agent comprises a software module executing on the endpoint device;
   a controller that receives from the endpoint device identification information associated with the user and the health information generated by the agent, wherein the controller includes an authentication engine that authenticates the user and identifies a plurality of roles defined for the user, wherein each role of the plurality of roles corresponds to a membership in a group of users, wherein the controller includes a plurality of policies specifying roles that are to be excluded upon failure of health indicators, and wherein the controller generates access control information by applying the policies with the authentication engine to restrict the roles defined for the user by excluding a subset of the identified roles based on the health information of the endpoint device; and
   a protection device coupled to the network, wherein the protection device provides access to the network resources by the endpoint in accordance with the non-excluded roles identified for the user.

2. The system of claim 1, wherein the controller generates the access control information as a function of the user of the endpoint device, the security state of the endpoint device used by the user, and the network resource that the user attempts to access.

3. The system of claim 1, wherein the access control information specifies actions to apply to communications from the endpoint device.

4. The system of claim 1, wherein the access control information specifies different actions to be applied for different security states of the endpoint device.

5. The system of claim 1, wherein the access control information specifies different actions to be applied for different network resources.

6. The system of claim 1, wherein the access control information specifies different actions to be applied for different roles of users.

7. The system of claim 1, wherein the health information specifies whether the endpoint device possesses a characteristic detectable by a software module.

8. The system of claim 1, wherein the controller comprises a verification engine to verify the identification information.

9. The system of claim 1, further comprising:
   a protection device policy table that specifies actions to be applied by the protection device to communications for different combinations of roles and network resources; and
   an address map that maps to a network address to a set of roles associated with an endpoint,
   wherein a protection device uses the protection device policy table and the address map to determine which resources may be accessed by an endpoint.

10. The system of claim 1, wherein the agent generates the health information in response to a change to the security state of the endpoint device.

11. The system of claim 1, wherein the agent generates the health information at the time the user attempts to access the network resources.

12. The system of claim 1, wherein the defense agent generates the health information according to a defined time interval.

13. The system of claim 1, wherein the agent provides an interface by which the user brings the endpoint device into compliance with a set of network policies.

14. The system of claim 13, wherein the interface prompts the user to update applications on the endpoint device.

15. The system of claim 1, wherein the agent includes a personal firewall executing on the endpoint device, and wherein the controller configures the personal firewall to control outbound network packets from the endpoint device.

16. The system of claim 1, wherein the endpoint device communicates with the protection device using a secure network protocol.

17. The system of claim 1, wherein the protection device is coupled to the network between the endpoint device and the set of network resources.

18. A method comprising:
   receiving, with a controller, identity information for a user attempting to access a network via an endpoint device;
   authenticating the user;
   upon authenticating the user, identifying a plurality of roles defined for the user, wherein each role of the plurality of roles corresponds to membership in a group of users;
   receiving, from the endpoint device, health information generated by a software module executing on the endpoint device, wherein the health information represents a security state of the endpoint device;
   based on a failure of a health indicator within the health information, restricting, with the controller, the plurality of roles defined for the user by applying one or more of policies to exclude a subset of the plurality of roles defined for the user;
   generating access control information based on the restricted roles for the user; and
   applying the access control information to provide access to the network resources in accordance with the non-excluded roles defined for the user.

19. The method of claim 18, wherein the access control information specifies actions to apply to communications from the endpoint device.

20. The method of claim 18, wherein generating access control information further comprises generating access control information as a function of the user, the health information of the endpoint device used by the user, and a specific network resource that the user attempts to access.

21. The method of claim 18, wherein the access control information specifies different actions to be applied for different security states of the endpoint device.

22. The method of claim 18, wherein the access control information specifies different actions to be applied for different network resources.

23. The method of claim 18, wherein the access control information specifies different actions to be applied for different roles of users.

24. The method of claim 18, wherein the health information specifies whether the endpoint device contains a virus.

25. The method of claim 18, wherein the health information specifies whether a required software application is installed on the endpoint device.

26. The method of claim 18, wherein the health information specifies whether a required software process is executing on the endpoint device.

27. The method of claim 18, further comprising verifying the identity information.

28. The method of claim 18, further comprising:
mapping the identity information and health indicators to the roles; and
specifying actions to be applied to network communications for different combinations of the roles and the network resources.

29. The method of claim 28, wherein controlling access to the network resources comprises applying the actions to network communications sent to the network resources.

30. The method of claim 28, wherein mapping the identity information comprises entering mappings of identity information to the roles in a database.

31. The method of claim 18, further comprising configuring a personal firewall installed on the endpoint device with the software module to control network communications from the endpoint device.

32. The method of claim 18, wherein generating the health information comprises generating the health information in response to a change to a security state of the endpoint device.

33. The method of claim 18, wherein generating the health information comprises generating the health information at the time the user attempts to access the network resources.

34. The method of claim 18, wherein generating the health information comprises generating the health information according to a defined time interval.

35. The method of claim 18, further comprising providing an interface by which the user brings the endpoint device into compliance with a set of network policies.

36. The method of claim 35, wherein providing the interface comprises prompting the user to update applications on the endpoint device.

37. The method of claim 18, wherein the protection device is coupled to the network between the endpoint device and the set of network resources.

38. A non-transitory computer-readable storage medium having program code encoded thereon comprising instructions that, when executed, cause a programmable processor to:
receive identity information for a user attempting to access a network via an endpoint device;
receive, from the endpoint device, health information generated by a software module executing on the endpoint device to collect health information about the endpoint device;
authenticate the identity information;
identify a plurality of roles defined for the user, wherein each role of the set of roles corresponds to membership in a group of users;
modify a set of roles for the user based on a failure of a health indicator within the health information about the endpoint device by applying one or more of policies to exclude a subset of the plurality of roles defined for the user;
assign access rights to the user based on the modified roles; and
permit the user to access network resources in accordance with non-excluded roles defined for the user.

39. The system of claim 1,
wherein the health information generated by the agent of the endpoint device comprises a report listing specifying that the endpoint fails one or more of a plurality of health indicators; and
wherein the protection device controls access by limiting access to a reduced subset of the network resources.

40. The method of claim 18,
wherein generating health information further comprises generating a report listing whether the endpoint passes or fails each of a plurality of health indicators, wherein the endpoint device used by the user fails one or more of the health indicators; and
wherein applying access control information to control access to the network resources permits access to a reduced subset of network resources.

41. The method of claim 18,
wherein the health information comprises a report listing whether the endpoint passes or fails a set of health indicators, wherein the endpoint device used by the user passes all of the health indicators; and
wherein applying access control information to control access to the network resources does not further limit access to the network resources.

* * * * *